(Model.)
W. B. CLEVES.
SEED PLANTER.
No. 244,856. Patented July 26, 1881.
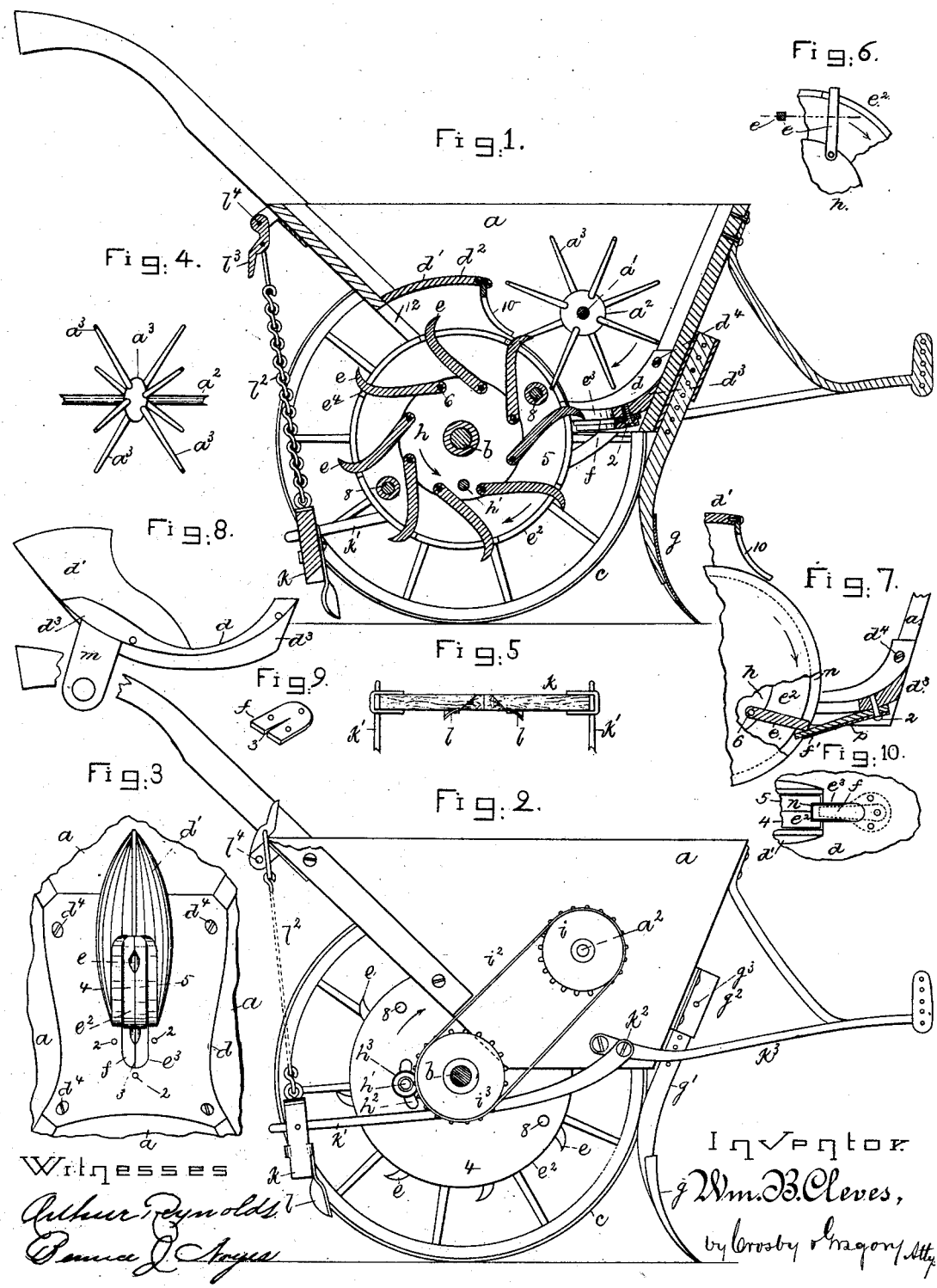
Witnesses
Arthur Reynolds
[signature]
Inventor
Wm. B. Cleves,
by Crosby & Gregory, Atty.
N. PETERS, Photo-Lithographer, Washington, D. C.

UNITED STATES PATENT OFFICE.

WILLIAM B. CLEVES, OF ATLANTA, GEORGIA.

SEED-PLANTER.

SPECIFICATION forming part of Letters Patent No. 244,856, dated July 26, 1881.

Application filed March 7, 1881. (Model.)

*To all whom it may concern:*

Be it known that I, WILLIAM B. CLEVES, of Atlanta, Fulton county, State of Georgia, have invented a new and useful Improvement in Seed-Planters, of which the following description, in connection with the accompanying drawings, is a specification.

This invention relates to improvements in planters for planting seed, and is designed for cotton as well as other seeds.

In this my invention the seed placed in the hopper is taken therefrom intermittingly by means of teeth connected with a rotating drum, the said teeth entering the hopper and engaging and removing more or less seed therefrom, according to the distance the said teeth project from the said drum, the seed dropping in a furrow made by a plow, after which the seeds are covered with earth by a coverer having two blades. All the teeth which project from the periphery of the drum are connected, as herein shown, with a tooth-adjusting plate, by which all the teeth may be simultaneously adjusted to project more or less from the carrying-drum. The hopper has within it a stirrer, which, turning in the same direction as the drum and its teeth, keeps the seed in agitation and causes the seed to be properly lodged under the teeth of the drum as they approach the seed-delivery opening at the bottom of the hopper, so that the teeth cannot pass from the hopper without taking the proper quantity of seed. The cast-metal bottom piece of the hopper, below the seed-delivery opening, is provided with a valve which yields to the seed and teeth, but as each tooth passes operates quickly to close the said opening. The valve referred to will be composed of vulcanized india-rubber, re-enforced or combined, if desired, with a thin steel spring. The cast-metal bottom piece as made by me has a hood to partially cover the drum and teeth. The sides and ends of the bottom piece are beveled at the proper angle to have the sides and ends of the hopper connected therewith by screws, and the under side of the bottom piece has cast with it ears to form bearings for the axle of the planter.

My invention is herein shown as embodied in a planter having wheels at each side of the hopper; but instead thereof I desire it to be understood that my improvements might be applied to that other well-known class of planter or seed-drill containing one wheel placed directly in front of the center of the hopper, and another roller immediately at the rear of the hopper in line with the front wheel. I have not shown this latter construction of planter in my drawings, because it is a well-known method of supporting the hopper so that it may roll over the ground.

Figure 1 represents a vertical central section of a planter containing my improvements; Fig. 2, a right-hand side elevation thereof, the hopper-sustaining wheel at that side of the planter being removed, the axle for the said wheels being shown in section. Fig. 3 is an interior view of the bottom of the hopper, showing the hood therein that partially covers the drum which carries the seed-engaging teeth and the valve to close the seed-delivery opening of the bottom piece. Fig. 4 is a top view of the stirrer removed from the hopper. Fig. 5 is a detail showing the front or acting edge of the coverer. Fig. 6 is a detail showing a modified form of tooth connected with a piece of the tooth-adjusting device and extended through a part of the drum, the small detached part at the left showing the tooth in cross-section. Fig. 7 is a detail of a modified form of drum and valve; Fig. 8, a side elevation of the bottom piece alone, looking at it from the right of Fig. 3; Fig. 9, a detail of the india-rubber valve, shown more clearly than in Figs. 1 and 3; and Fig. 10 is a partial top view of Fig. 7, the dotted lines showing the steel spring below the india-rubber or upper part of the valve.

The cast-metal bottom piece, $d$, of the hopper $a$ has lugs $m$ cast upon it to serve as bearings for the axle $b$, which at each end has a wheel, $c$, which rests upon the ground and enables the planter to be easily moved about. These wheels $c$ may both be loose upon the axle $b$, or one may be fast and the other loose, as now common in planters, seed-drills, &c. The metal bottom piece, $d$, is provided at its center, at the rear of the hopper, with an upwardly-extended hood, $d'$, having within it a space, $d^2$, through which the teeth $e$ of the drum $e^2$ pass on their way into the hopper to engage seed and remove it from the hopper through the discharge-passage $c^3$ in the said bottom plate, after which the seed falls upon the ground. This bottom piece is concaved to enable the seed to always settle in the said concave and rest in the range of the teeth $e$, and the edges of the bottom pieces being beveled, as at $d^3$, Fig. 1, enable the sides and ends of the hopper to be readily secured thereto in proper inclined position by means of screws $d^4$ or otherwise.

The delivery-opening $e^3$ in the bottom of the hopper is closed by a valve, $f$, shown separately in Fig. 9, preferably made from vulcanized india-rubber, the said valve being sufficiently stiff to maintain the seed in the hopper $a$, except when the seed is pressed against the said valve by means of a tooth, $e$, as it is moving out from the bottom of the hopper through the delivery-opening $e^3$ and pushing seed in advance of it. In Figs. 1 and 3 this valve is shown as of a piece of india-rubber secured to the under side of the hopper by screws 2, the said rubber valve being split for a portion of its length, as at 3, so as to yield to the passage of the teeth and seed and immediately close and stop the delivery-opening $e^3$ after the passage of a tooth, $e$, beyond the valve.

The plow $g$ has its shank $g'$ placed within the socket $g^2$, secured to the front side of the hopper $a$, and is held therein by means of a pin, $g^3$, the shank $g'$ of the plow being provided with a number of holes to permit it to be adjusted to form a furrow of the desired depth.

The drum $e^2$, secured to the shaft $b$ at or near the center of its length, is herein shown as composed of two annular disks, 4 5, placed face to face, (see Fig. 3,) the contiguous faces of the said disks being notched, as at $e^4$, for the passage of the teeth $e$, they projecting from the said drums. Each tooth $e$ is pivoted, as shown at 6, to a tooth-adjusting device, $h$, herein shown as a disk. This disk, loose with relation to shaft $b$, upon which the drum $e^2$ is fixed, may be turned more or less about the shaft $b$, while the drum $e^2$ is stationary, and the ends of the the teeth $e$ may thus be made to project more or less from the said drum, according to the quantity of seed which it is desired that each tooth shall remove from the hopper. The further the teeth are made to project the more seed they will remove from the hopper, and vice versa. This tooth-adjusting device $h$ has attached to it a screw, $h'$, which is extended out through a curved slot, $h^2$, in the disk 4, (see Fig. 2,) where a nut, $h^3$, is applied to it. When the nut $h^3$ is loosened the adjusting device may be turned to move the teeth out or in, the maximum and minimum distance being controlled by the length of the slot $h^2$, and the disk may then be secured in place by the nut $h^3$. Turning the disk in the direction of the arrow on it, Fig. 1, will project the teeth farther.

For cotton-seed and some other classes of seed the teeth $e$ will be hooked or concaved, and have their front or acting faces made flat, as shown in Figs. 1 and 2; but for other classes of seed, including corn, the ends of the teeth, instead of being hooked or concaved, will be made straight or of rectangular cross-section, as in details, Fig. 6 and in Fig. 7.

The two disks 4 5 will be held together by suitable bolts 8, (shown in Fig. 1.)

The front or open face of the hood $d'$ (see Fig. 1) will be provided with a guard, 10, composed of india-rubber, substantially like the valve $f$, Fig. 9, to prevent seed from passing backward from the hopper to the ground through the opening or space 12, but yielding readily to the teeth $e$ when the drum $e^2$ is being rotated in the direction of the arrow upon it. This guard is omitted from Fig. 3, so as not to hide the edges of the disks 4 5 composing the drum. The hood $d'$, Fig. 1, rising from the bottom plate of the hopper, will be extended forward over the drum $e^2$ to a point where a perpendicular line dropped from the hood would intersect or pass to the right of shaft $b$.

Within the hopper $a$, on a shaft, $a'$, I have placed a stirrer composed of a collar, $a^2$, which holds a series of arms, $a^3$, inclined in opposite directions to form a space between them through which the teeth $e$ may travel in their rotation, the said arms $a^3$ being sufficiently wide spread apart at their outer ends to pass outside of the drum, and the hood $d'$ in which the periphery of the drum travels, the periphery of the said drum where it is exposed through the hopper being flush with the edges of the hood. The stirrer, rotated by means hereinafter described, in the direction of the arrow thereon in Fig. 1, forces the seed in the hopper against the drum $e^2$ and within the range of the ends of the teeth $e$, so that the said teeth will always engage the desired amount of seed.

The shaft $a'$, outside of the hopper, (see Fig. 2,) is provided with a sprocket-wheel, $i$, engaged by a chain, $i^2$, or belt extended over the second sprocket-wheel $i^3$, secured to the axle $b$, the rotation of the sprocket-wheel $i^3$ moving the chain and causing it to rotate the shaft $a^2$.

The coverer is composed of a bar, $k$, having twisted shovel-like blades $l$. The bar is pivoted upon arms $k'$, jointed at $k^2$ upon that part of the frame-work $k^3$ extended in front of the hopper. (See Fig. 2.) This coverer is connected by a suitable chain or link, $l^2$, with a coverer-lifter, $l^3$, pivoted at $l^4$ upon an ear of the hopper $a$, and so shaped that when the lifter is elevated, as in Fig. 2, the point where the connection $l^2$ is joined with the lifter $l^3$ will pass inside the pivot $l^4$, thus keeping the coverer elevated, as in Fig. 2. When the lifter is turned back or down, as in Fig. 1, the coverer will be held in proper position to act upon and partially replace the earth thrown aside by the plow $g$, moving the earth toward and so as to cover the seed removed from the hopper by the teeth $e$.

When teeth such as shown in Fig. 6 are employed for use with other than cotton-seed I prefer to provide the periphery of the drum $e^2$ with an annular groove, $n$, as shown in Figs. 7 and 10, (one-half of the groove being made in each disk 4 5,) to permit the seed to lodge therein in front of or below the downwardly-moving-teeth $e$. In such modification of my invention the valve $f$ will be made as a tongue, (see Fig. 10,) with its end extended into the seed-groove $n$, so that the said valve not only covers the delivery-opening $e^3$, but also stops the groove made in the drum. The said valve will preferably be provided at its under side with a spring-steel support, $p$, to enable it to recover itself more readily after being depressed by a tooth and move it quickly to close the opening $e^3$ after the passage of a tooth beyond it. In Fig. 7 a tooth has partially depressed the valve.

I have not considered it necessary to represent the seed.

Fertilizers may be employed in this planter as in others.

I have herein shown but one drum, $e^2$, connected with the axle $b$; but I desire it to be understood that I may employ two or more of these seed-drums on the same shaft, thus forming a two or more rowed planter.

I claim—

1. The hopper $a$, having the concaved metal bottom $d$, provided with beveled edges to receive the sides and ends of the hopper, as shown, and also provided with a valvular discharge-opening and hood, combined with a feed-wheel arranged in said hood, substantially as described.

2. The concaved cast-metal bottom piece, $d$, as shown, beveled at its outer edges, as at $d^3$, to receive against it the ends and sides of the pieces forming the hopper $a$, substantially as described.

3. The hopper $a$, having the concaved metal bottom $d$, provided with beveled edges to receive the sides and ends of the hopper, as shown, and also provided with a valvular discharge-opening and hood, and bearing lugs $m$ for the axle, combined with the feed-wheel, its axle, and the driving-shaft, substantially as described.

4. The drum $e^2$, having slot $h^2$, and notched at its periphery to receive teeth, combined with the adjusting disk or plate $h$, its pin $h'$, and nut $h^3$, the series of teeth $e$, connected to plate $h$ and extended outward through the periphery of the drum, to enable the said teeth to be simultaneously adjusted to project more or less beyond the periphery of the drum, substantially as and for the purpose set forth.

5. The hopper, the bottom piece provided with the seed-delivery opening, and the valve to close the said opening, combined with the rotating drum $e^2$, notched at its periphery, and the series of adjustable hooked teeth $e$, having their acting faces flattened, substantially as and for the purpose described.

6. The hopper, its bottom piece provided with the hood and seed-delivery opening, and the drum $e^2$ and its teeth $e$, combined with the rotating stirrer having diverging arms and placed in the said hopper in front of the said hood and drum, substantially as described.

In testimony whereof I have signed my name to this specification in the presence of two subscribing witnesses.

WILLIAM B. CLEVES.

Witnesses:
M. McBURNEY,
C. STARR.